United States Patent [19]

Smith

[11] Patent Number: 5,040,055

[45] Date of Patent: Aug. 13, 1991

[54] PANORAMIC INTERACTIVE SYSTEM

[75] Inventor: Graham T. Smith, Toronto, Canada

[73] Assignee: Horizonscan Inc., Toronto, Canada

[21] Appl. No.: 601,232

[22] Filed: Oct. 22, 1990

Related U.S. Application Data

[63] Continuation-in-part of Ser. No. 448,263, Dec. 11, 1989, Pat. No. 4,985,762.

[51] Int. Cl.$^5$ .............................................. H04N 5/64
[52] U.S. Cl. ...................................... 358/87; 358/254
[58] Field of Search ................................. 358/87, 254

[56] References Cited

U.S. PATENT DOCUMENTS

| | | | |
|---|---|---|---|
| 3,240,113 | 3/1966 | Stechemesser | 353/99 |
| 3,976,837 | 8/1976 | Lang | 358/87 |
| 4,125,862 | 11/1978 | Catano | 358/87 |
| 4,160,973 | 7/1979 | Berlin | 358/88 |
| 4,613,898 | 9/1986 | Bagnall-Wild | 358/87 |
| 4,800,438 | 1/1989 | Yuter | 358/254 |
| 4,943,851 | 7/1990 | Lang | 358/87 |
| 4,985,762 | 1/1991 | Smith | 358/87 |

*Primary Examiner*—Howard W. Britton

[57] ABSTRACT

This invention relates to a method and apparatus for viewing of a panorama or large portion thereof by selectively displaying a portion thereof on a video display device or other means and in a manner that forces the user to change his own orientation to vary the portion of the panorama viewed. Such a method and apparatus coordinates the user's normal feedback responses associated with changing orientation to changes in the portion of the panorama viewed. In a preferred embodiment, a simple apparatus for allowing a user or users to view the recorded panorama is disclosed.

9 Claims, 11 Drawing Sheets

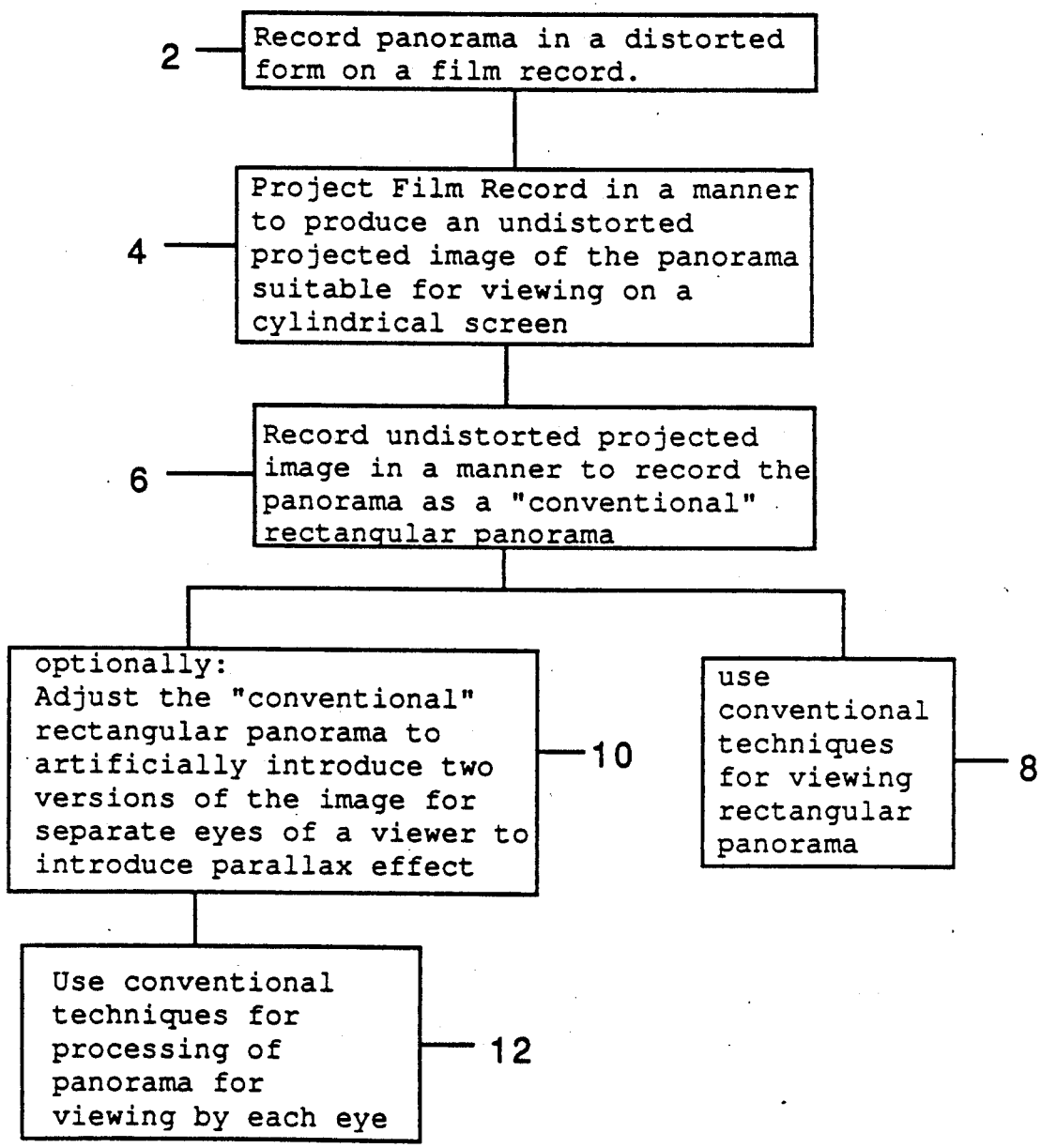

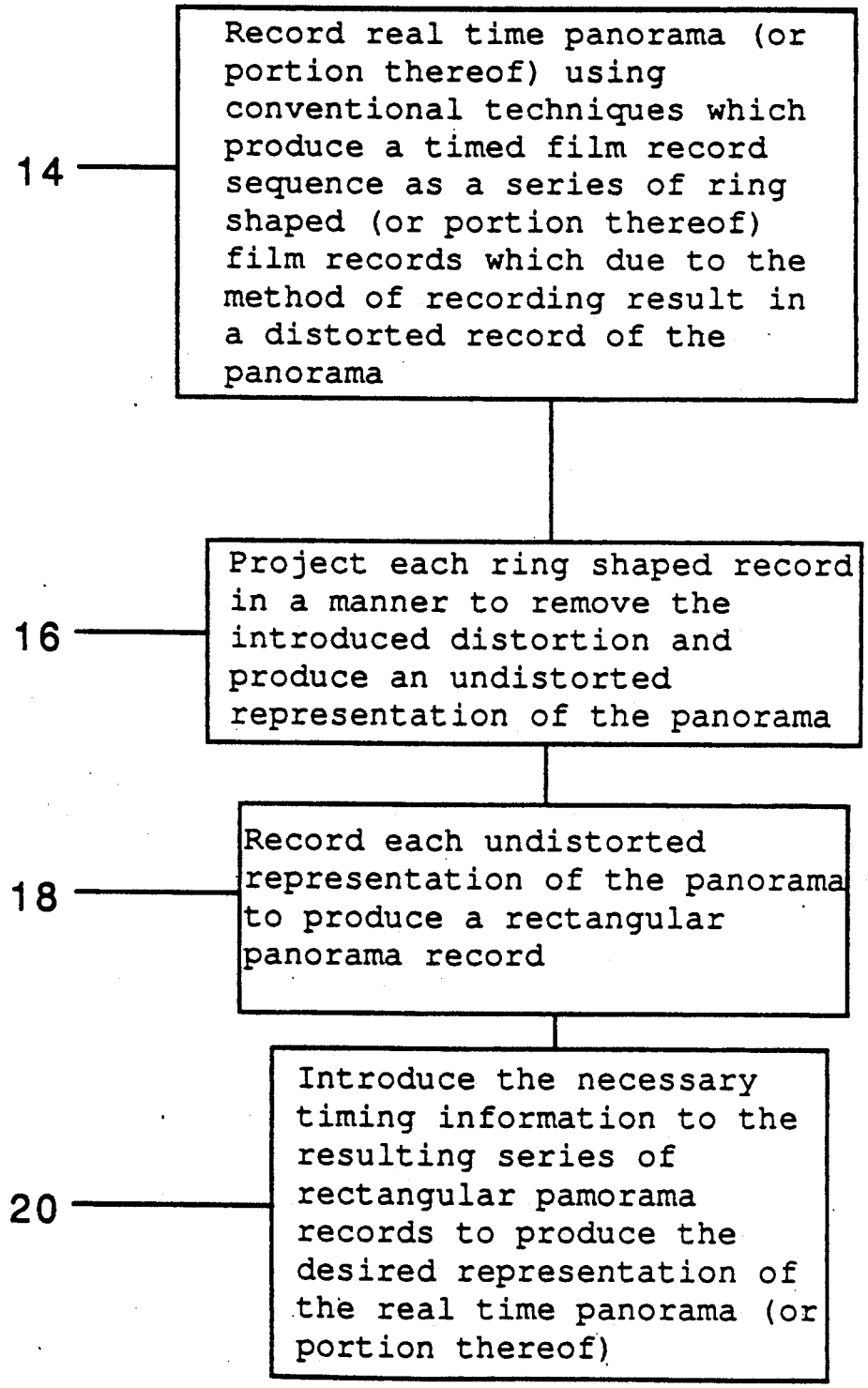

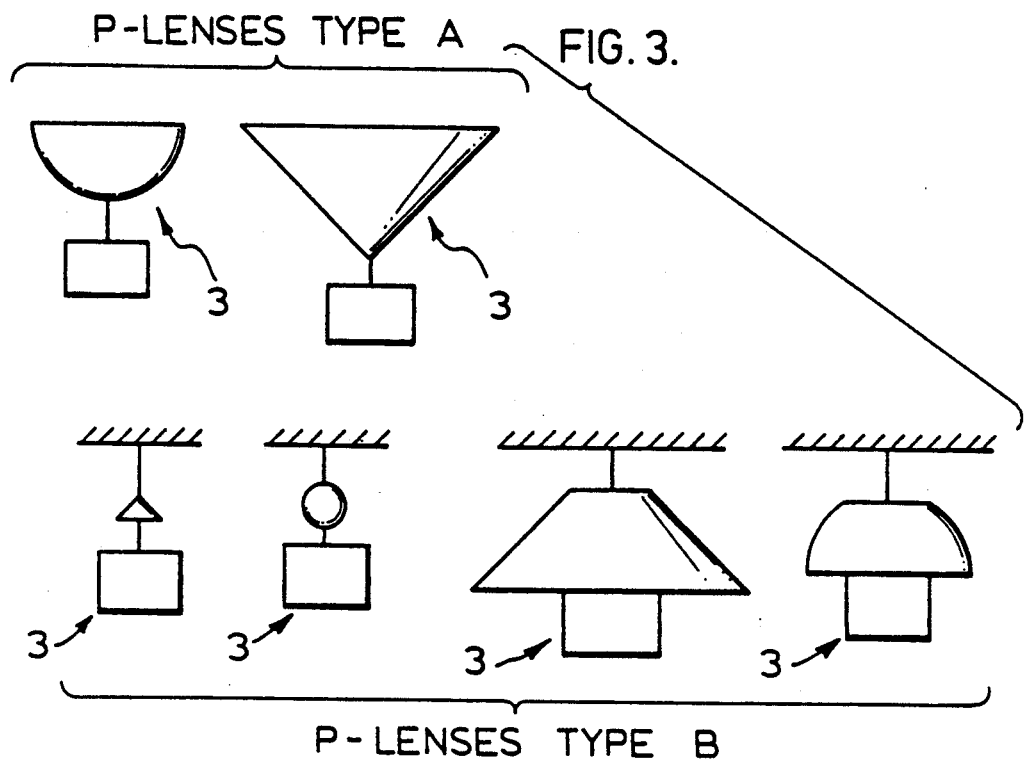
FIG. 3. P-LENSES TYPE A / P-LENSES TYPE B
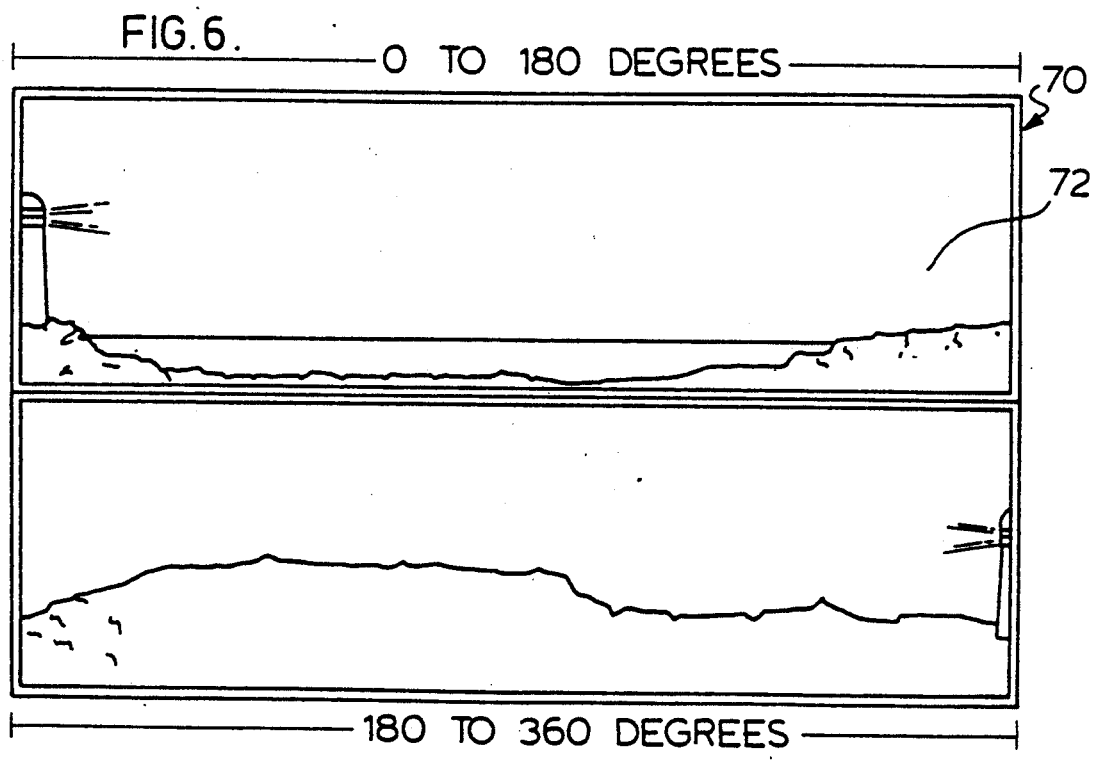
FIG. 6.

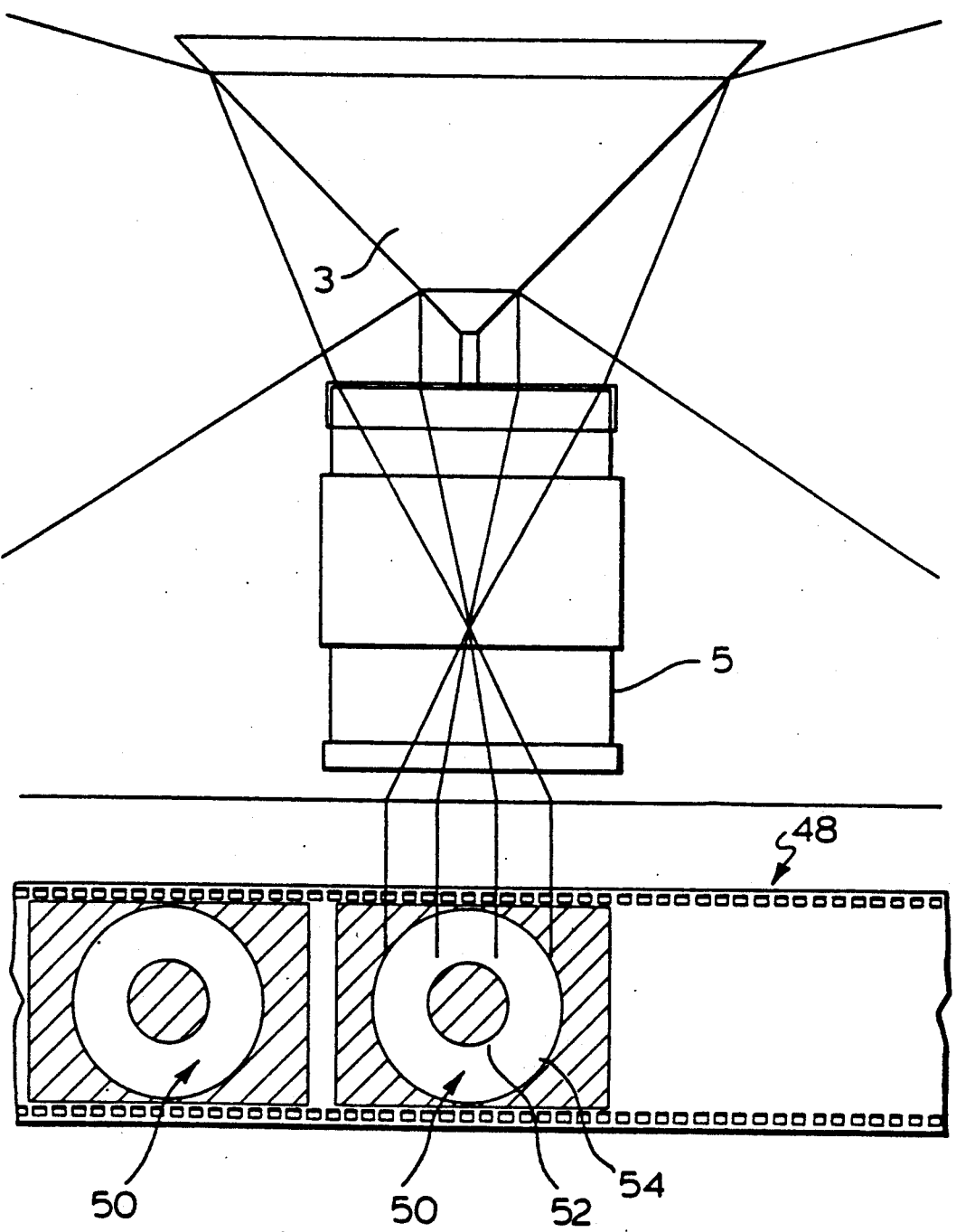

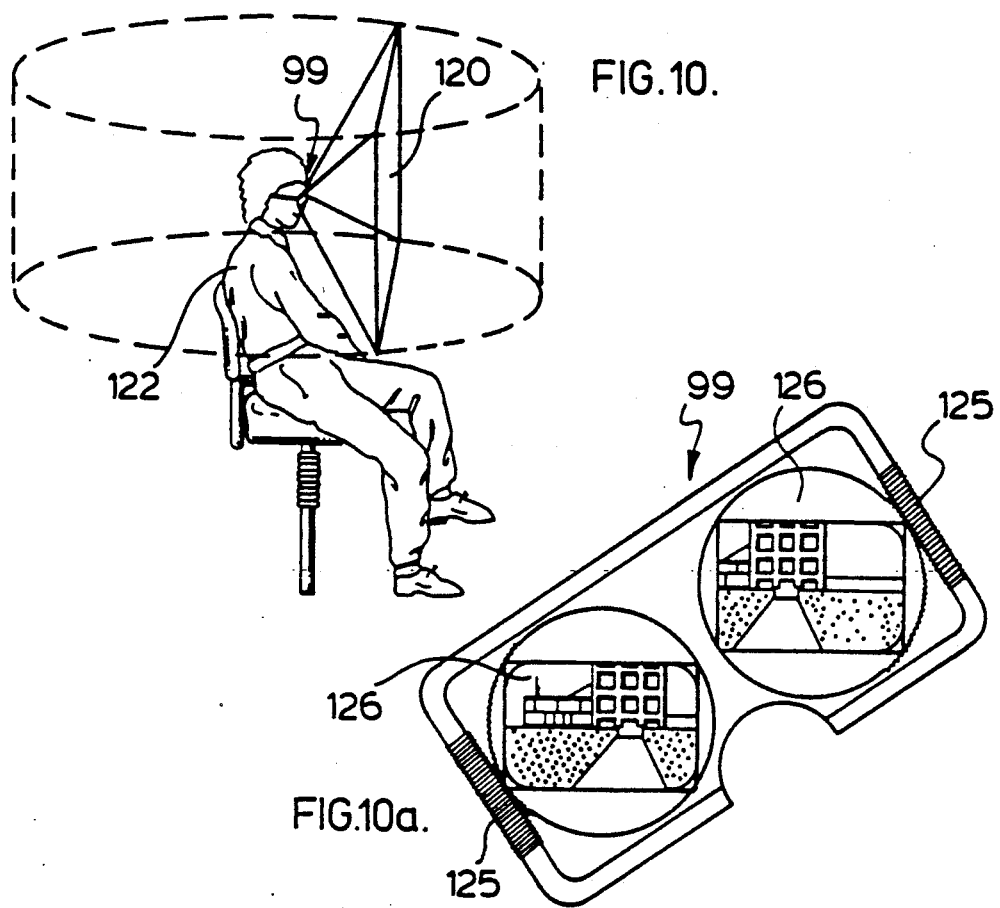
FIG. 10.
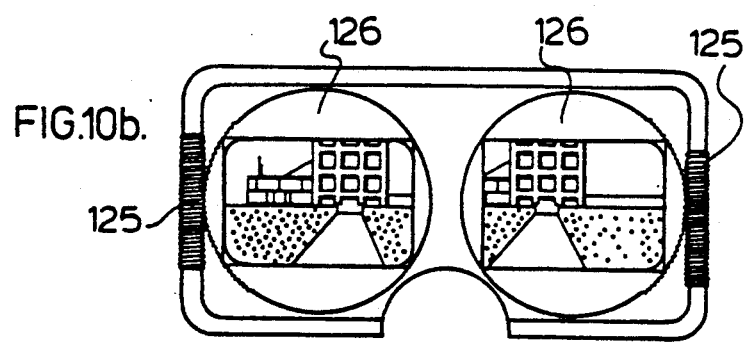
FIG.10a.
FIG.10b.
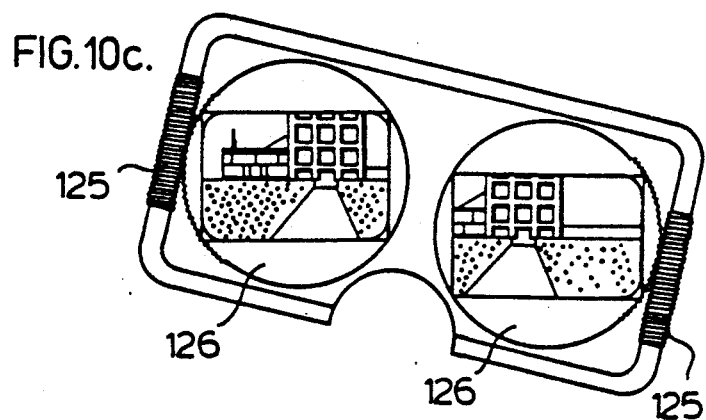
FIG.10c.

PANORAMIC INTERACTIVE SYSTEM

CROSS-REFERENCE TO RELATED APPLICATIONS

This application is a continuation-in-part of Application Ser. No. 07/448,263 filed Dec. 11, 1989, now U.S. Pat. No. 4,985,762.

BACKGROUND OF THE INVENTION

Panoramic recording systems are known and have used moving imagers, fish-eye lenses, multiple cameras or panoramic lenses for recording of a panorama or a large portion thereof. Many of the known techniques are suitable for a still panorama, however, even in this case, changing light conditions or changes within the panorama can cause distortion and loss of accuracy.

The use of panoramic lenses or fish-eye lenses in recording of an image produce a distorted form of the image on a film record. The film record is basically a circular mapping of the panorama and are difficult to use in that format. It is known to take these film records and project them on a cylindrical screen for viewing. In the case of real time panoramic imaging, recording of the image in this particular form does provide good detail, but viewing in the circular form is not particularly satisfactory.

One example of a different method for recording a generally static panoramic image is disclosed in U.S. Pat. No. 4,125,862 which issued Nov. 14, 1978. This patent discloses a system where the panorama is scanned in a series of discreet segments and the information is recorded in a format suitable for use in displaying of portions of that panorama on a video display unit. The time interval to effectively scan the entire panorama renders this type of direct recording of the panorama only useful for generally static panoramas or ones in which real time imaging is not critical. With such a system, changing light conditions may also cause portions of the panorama to be less visible.

U.S. Pat. No. 3,240,113, which issued to Stechemesser et al Mar. 15, 1966, discloses a particular image gathering arrangement which utilizes panoramic lenses and results in recording of the panorama on a film record in a ring type shape. This patent also illustrates how the recorded images can be reprojected and shown on a cylindrical screen.

There remains a need to provide a simple system for viewing of a panorama image stored in a suitable accessible record media.

There also remains a need to provide a system for the convenient and effective viewing of a real panorama image while providing the user with some of the physical sensations associated with normal scanning of an actual panorama.

SUMMARY OF THE INVENTION

The present invention is directed to an apparatus for viewing of a real panoramic image where the apparatus comprises frame buffer means for digitally storing the real panoramic image and means for viewing of a selected segment of the stored real panoramic image. The viewing means includes user controlled moveable viewing screen means, with this viewing screen means displaying the selected segment of the stored panoramic image. The viewing screen means has sensing means for sensing rotational movement of the viewing means and in accordance with this sensed rotational movement, adjusting the selected segment of the stored real panoramic image stored in the frame buffer means. With this arrangement, the user selectively moves the viewing screen means to vary the selected segment of the stored real panoramic image displayed by the viewing screen means.

According to an aspect of the invention, a video display viewing table is disclosed comprising a base portion and a top section rotatable relative to the base portion. The top section is supported by the base by a fixed shaft which rotates with the top section. A bearing suitably supports the top section to the base. The shaft has associated therewith an optical shaft encoder whereby rotation of the top section relative to the base can be sensed and estimated by the optical shaft encoder.

BRIEF DESCRIPTION OF THE DRAWINGS

Preferred embodiments of the invention are shown in the drawings, wherein:

FIG. 1 is a flow chart showing the recording of a still panorama;

FIG. 2 is a flow chart showing the recording of a real time panorama;

FIG. 3 is a schematic illustrating various types of panoramic lenses referred to as P-lenses, type A and type B;

FIG. 4 is a schematic illustrating the recording of a panorama using a P-lens to produce the ring shaped initial film record;

FIG. 6 shows the preferred rectangular panorama record produced by the apparatus of FIG. 5;

FIG. 10 is a representation of a viewer's field of view;

FIGS. 10a, 10b and 10c show certain displays on the screens of video glasses;

DETAILED DESCRIPTION OF THE PREFERRED EMBODIMENTS

The method and apparatus of the present invention convert a still panorama into a conventional rectangular panorama record suitable for use in selective display on a video display device. Such a conventional rectangular panorama record is known, as exemplified by U.S. Pat. No. 4,125,862. Such an arrangement has a user control which allows the user to select what portion of the rectangular panorama record that he wishes to have displayed on the video display device and for simulating moving within the panorama by adjusting the controls.

The first step 2 of the method illustrated in FIG. 1 requires recording of the panorama in a distorted form preferably as a ring or portion thereof on a film record, resulting in a circular mapping. This recording is accomplished, for example, by using a F-lens 3 and a conventional camera arrangement 5 to produce a record 50 as generally shown at the bottom of FIG. 4. Each one of the ring shaped images 50 would represent the panorama at a single point in time or correspond to a still panorama. Each record 50 provides a distorted recording of the panorama and is generally difficult to directly use by individuals or effectively use by means of a video display device. What is normally done with this type of recording is to project the image as set out in the second step 4 of FIG. 1 which requires projecting the film record 50 in a manner to produce an undistorted projected image of the panorama suitable for viewing on a cylindrical screen.

Figure 5:
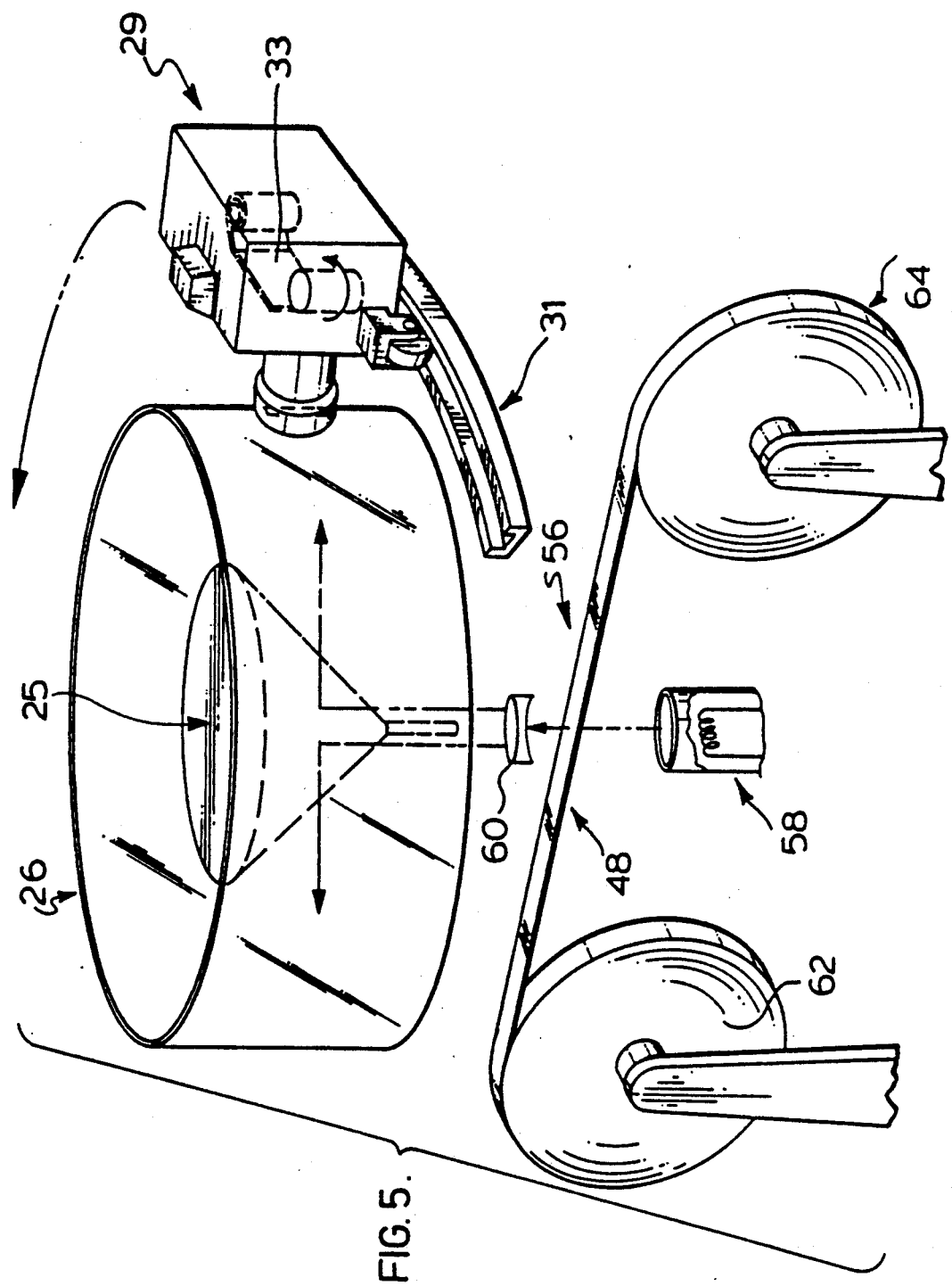
FIG. 5 is a partial perspective showing the projection of the film record of FIG. 4 and the subsequent recording of the projected record by means of a Ross.

The projection of the film record 50 is illustrated in FIG. 5 and, in this case, is shown for projecting of a series of film records 48 which would be used in conversion of a real time panorama. In the case of a still panorama, the film record 50 is merely projected generally using a similar optical system, as used in the recording, to remove the distortion and allow reproduction of the panorama on a cylindrical screen, labelled 26 in FIG. 5.

Panoramic lenses 3, as shown in FIG. 3, cause the image to be compressed at the narrow portion 52 and expanded at the wider portion 54, illustrated in record 50 of FIG. 4. This compression of the image makes it important to have a high resolution capability in the initial recording. The use of P-lenses 3 and high resolution film photography is particularly suitable, although the invention is not limited by this combination.

The high resolution is required to provide the accuracy in the projecting step 4 and determines to a large extent the accuracy of the recording step 6 of the projected image in the second stage of the method. The film records 50, in the form of a circular map shown at the bottom of FIG. 4, represent the entire panorama, with the innermost circular portion 52 representing the lower portion of the panorama scanned, and portion 54 representing the upper panorama scanned The resolution required for recording of the lower portion of the panorama is higher due to the compression thereof. The degree of distortion and manner of distortion will vary with the type of panoramic lens 3 used or fish-eye lens.

The next step 6 in the method requires recording of the undistorted projected image in a manner to record the panorama as a rectangular panorama 70 shown in FIG. 6. This step 6 is shown in FIG. 5 where a camera 29 is rotated about the panoramic lens 25 for recording of the projected panoramic image. This then results in the panorama being converted to a rectangular panorama record which can use conventional techniques 8, as shown in FIG. 1, for viewing thereof.

In a preferred embodiment, as illustrated in FIG. 1, it is possible to further process the rectangular panorama record, or the subsequent display of that record, to adjust the rectangular panorama, as illustrated in step 10, to artificially introduce two version of the image &or separate eyes of a viewer to introduce a synthetic parallax effect. This step increases the realism of the produced image and uses the video glasses 99 generally shown in FIG. 7. These video glasses have separate screens 100 and 102 associated with each lens of the glasses and thus the image reproduced on each screen by step 12 would be slightly different to introduce this desired effect.

The method, as generally set out in the first three steps of FIG. 1, allows for the accurate recording of the panorama, albeit in a distorted form, followed by the projection of this initial record to remove the distortion whereafter the projected image is then used for recording in a conventional rectangular panorama record the first step 2 is considered a first stage of the method, whereas the second and third steps 4 and 6 are considered a second stage of the method.

The accuracy of the recording in the first step can be reproduced in the conventional rectangular panorama record. The time requirement for the first step is very short, whereas the time requirement for the second recording is much longer. By recording in this manner, the accuracy of the first recording flows through to the resulting rectangular panorama record. The initial recording occurs quickly due to known technology and the subsequent recording the projected image to produce the conventional rectangular panorama record is time independent with respect to the recording of the actual panorama.

The benefits of the method, generally set out in FIG. 1, can further be realized for the various steps set out in the real time recording of a panorama exemplified in FIG. 2. The flow chart of FIG. 2 still requires the recording 14 of the panorama in a distorted form, but in this case, a series of distorted records 48 are produced having a known timing interval. The second step 16 requires projection of each of these distorted records in a manner to remove the introduced distortion to produce an undistorted representation of the panorama. This undistorted representation of the panorama is then used for recording 18 of the representation of the panorama in a rectangular panorama record. The initial recording occurs in real time, whereas the projection and subsequent recording does not occur in real time. Thus, a very accurate, but distorted record is first obtained, followed by the projection of the record to remove the distortion and the subsequent recording of the representation in a rectangular panorama record. To complete the method, it is necessary to introduce the required timing information by step 20 to result in the series of rectangular panorama records producing the desired representation of the real time panorama. As can be appreciated, there is timing information associated with the initial recording and this can be introduced into the sequencing of the series of rectangular panorama records once they have been recorded.

FIG. 3 illustrates various types of panoramic lenses 3 referred to as P-lenses, type A and type B. Both types of P-lenses operate satisfactorily and are preferrably used in the initial recording of the actual panorama.

FIG. 4 shows the recording of a panorama using a P-lens and a conventional camera. This will produce the ring shaped image 50 stored on film. This is a distorted record of the actual panorama and would be difficult for an individual to effectively use.

Each record 50 of the series of records 48 of FIG. 4 are used in the apparatus as generally shown in FIG. 5 for projecting of the record by means of the P-lens 25 to reproduce, in this case, the panorama on the cylindrical screen 26. Each record 50 of the series of records 48 is brought into registration with the projecting arrangement 56 comprising a light source 58 and a focusing lens 60. In this case, the series of records 48 is unwound from reel 62 and collected on reel 64. Camera 29 moves about track 31 a fixed radial distance from the panoramic lens 25. In this case, a film record 33 of a vertical segment of the panorama is produced which, in combination with the other records produced as the camera 29 sequentially moves about the panoramic lens, results in a rectangular record of the panorama.

As can be appreciated, whatever time is required to effect the accurate recording of the projected image is possible, as this step is not time dependent as the original record remains unchanging. Timing of the changing panorama image is introduced once all conversion of the original distorted records to the rectangular panorama record has been completed.

The method of recording the projected image need not use a cylindrical screen, as the recording can be made direct using a camera arrangement moved about the panoramic lens 25 or a CCD arrangement or other solid state recording device sequentially moved around the panoramic lens. It a solid state device is used, each recording position can be vertically scanned in a sequence of steps which collectively represent the vertical scanned portion. Thus, the actual record format for recording of the projected image or for recording of the initial image can vary as long as the desired accuracy of the final recording is satisfactory. High resolution film for the initial recording is the most desirable today, although improvements in solid state recording may make it preferred in the future. Direct recording of the projected image rather than recording from a screen may also improve accuracy.

FIG. 6 shows a preferred form of the rectangular panorama record 70 produced by the apparatus of FIG. 5. In this case, the first 0° to 180° 72 of the panorama are stored in an upper part of the record and portion 180° to 360° 74 are recorded in the lower part of the record resulting in the equal segments being stacked one atop the other in the buffer. This results in an approximate overall 3:5 image ratio (when the vertical scan is about 55°) which is easily stored using existing storage devices and existing buffers suitable for High Definition television. Such buffers or storage devices have sufficient capacity to permit only portions of the image to be displayed with good resolution. This is necessary, as typically only a portion of the panoramic record is being scanned at any point in time. This type of ratio is preferred, but other arrangements are possible for dividing the recorded panorama suitable for storage in common buffers having an overall image ratio of 3:5. The exact storage arrangement will vary depending upon the number of degrees in the vertical direction scanned. Different buffer arrangements can be designed based on particulars of the panorama recorded and the requirements of the overall system.

Figure 7:
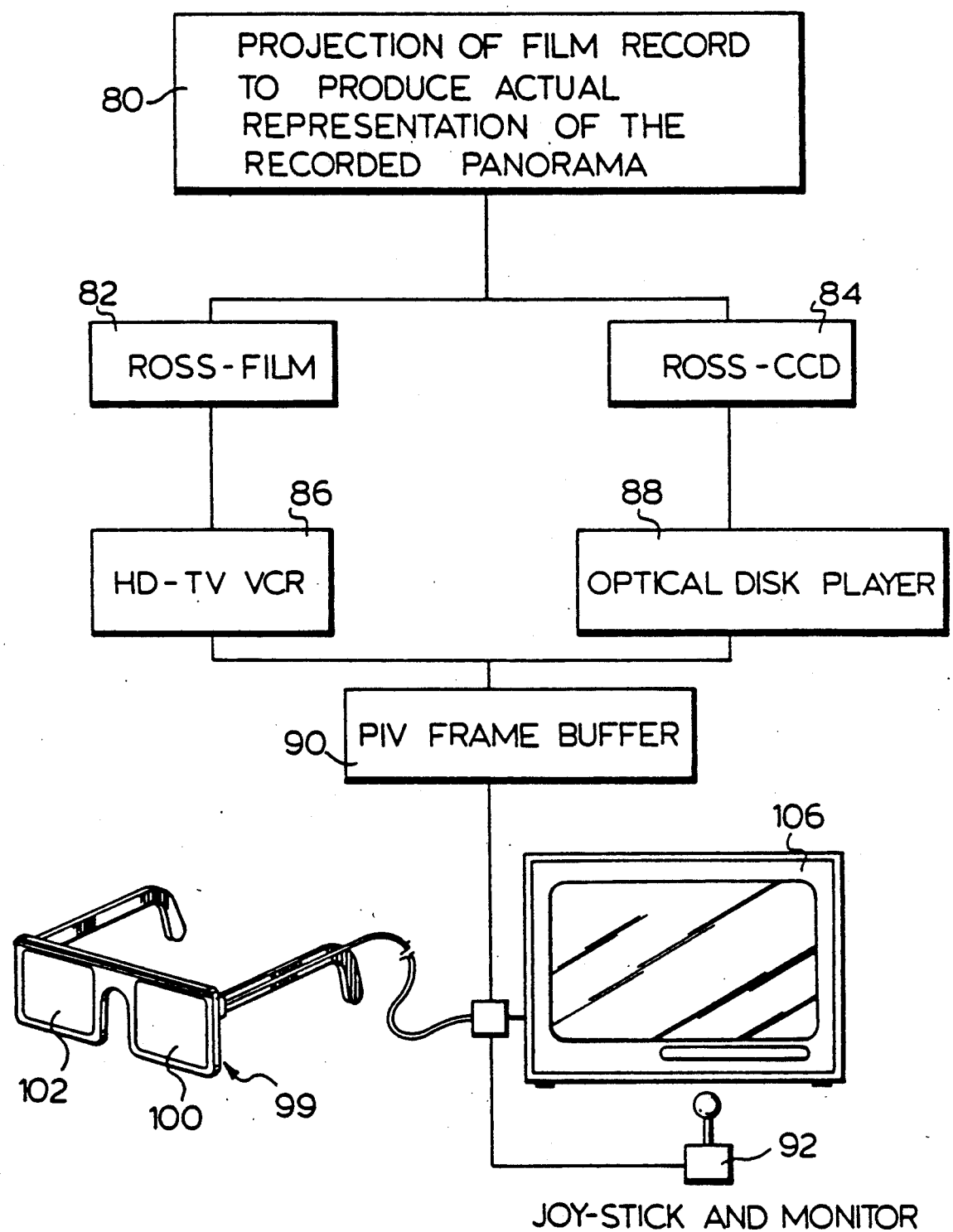
FIG. 7 is a schematic illustrating the projection of the film record of the first stage of the invention and the subsequent recording thereof and eventual display on a video display device.

FIG. 7 shows the second stage of the method which is essentially time independent. It includes the projection 80 of the film record to produce an actual projection representation of the recorded panorama, which could be viewed on a cylindrical screen, and this projected representation is then rerecorded using a rotating optical slit scanner for producing a film record (step 82) or a rotating optical slit scanner in combination with a CCD device (step 84). After the rectangular records have been produced and the necessary timing information reintroduced into the resulting series, the record can be accessed using conventional technology such as a high density T.V., VCR 86, 86, or optical disc player, depending upon the type of format used, in combination with a frame buffer 90 and various control arrangements for selecting which portion of the actual record the viewer wishes to consider. Such variation can be imparted to the system by the joystick control 92 or the use of the video glasses 99 which are responsive to the head movement of the user, as but two examples. The selected portion of the panorama is displayed on video display device 106.

The recording of the projected representation has been described on the basis that the projected representation is stationary and the recording arrangement moves. It is possible to sequentially rotate the projected representation and have the recording arrangement stationary.

Figure 8:
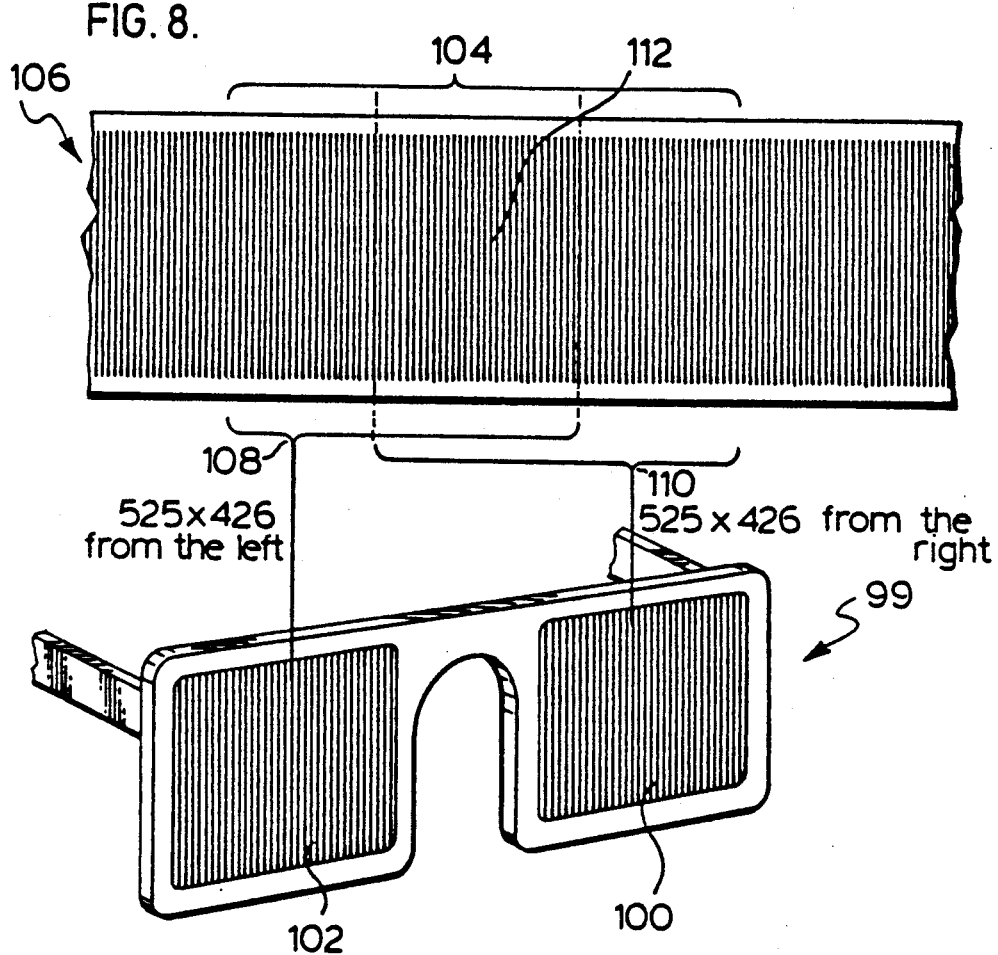
FIG. 8 is schematic of a portion of a rectangular panoramic record being sampled for display on video glasses associated therewith.
Figure 9:
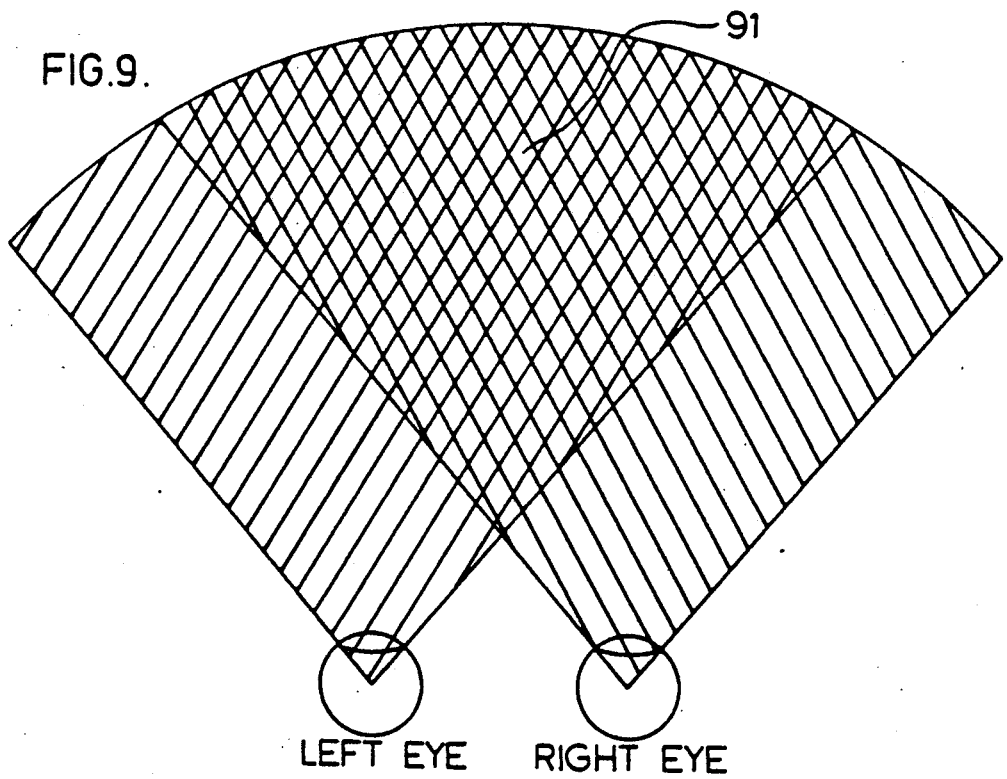
FIG. 9 is a schematic of the field of view of two eyes.

An enhancement to the viewing of the series of rectangular panoramic records, either by this method or any other method, can be accomplished by processing the signal to produce a synthetic parallax effect similar to the parallax effect used by human eyes. As shown in FIG. 8, the video glasses 99 have two screens 100 and 102 for viewing of a particular portion of the record. Human eyes, as shown in FIG. 9, have an overlapped field of view indicated by the crosshatching 91 of FIG. 9. To reproduce this effect, a portion 104 of the overall panoramic record 106 being sampled is used for each of the viewing screens 100 and 102. One of the viewing screens would only look at a limited portion of 104, indicated by the bracketed area 108. The opposite viewing screen would receive the signal resulting from the bracketed portion 110. This results in an overlapped area of the portion 104 of the record, indicated by 112, and thus, synthetically produces an effect similar to the overlap illustrated in FIG. 9. In order to produce this, computer software merely selects the appropriate portion of the record to be displayed with respect to each of the video screens 100 and 102, in accordance with the principles set out above.

Figure 11:
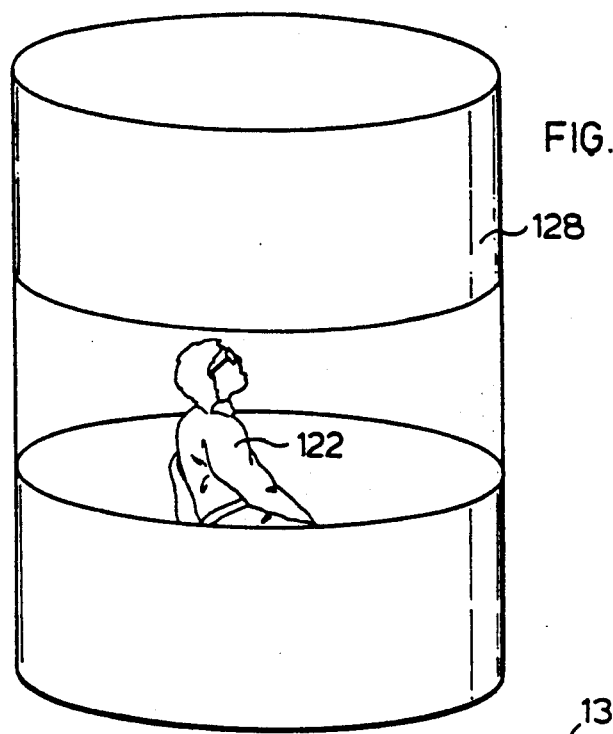
FIG. 11 is a representation of various fields of view of a user.

A further enhancement of the viewing of these types of records is illustrated in FIGS. 10 and 11. FIG. 10 illustrates a particular field of view 120 of the user 122 provided with the video glasses 99. As long as the user does not tilt his head from side to side, the horizon in each of the viewing screens will remain horizontal FIG. 10b. However, if he tilts his head from side to side, this will result in an artificial tilt of the horizon which is an effect which would not be experienced if the user merely tilted his head in actual life. To overcome this deficiency, the video glasses 99 can include separate means 125 for maintaining the represented horizons of the image horizontal, as illustrated in embodiments of FIG. 10a, b and c. The glasses can be provided with their own motorized arrangement 125 for effecting this sympathetic movement of the screens to correspond with actual reality, or computer software can be used and the angle of the glasses sensed with the resulting view to be displayed merely shifted according to this sensed angle. In the mechanical arrangement of FIGS. 10a, 10b and 10c, the viewing screens are mounted for rotation in a circle mount 126 having drives 125 provided at either side of the glasses.

Figure 11A:
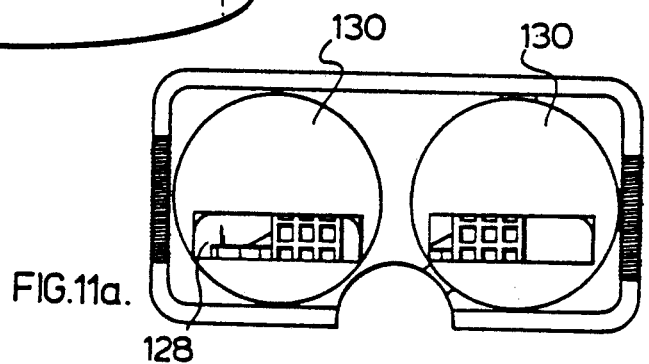
FIGS. 11a, 11b and 11c show certain displays on the screens of the video glasses under different actions of the user.
Figure 11B:
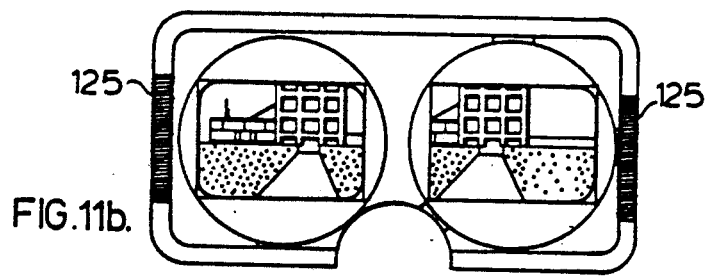
Figure 11C:
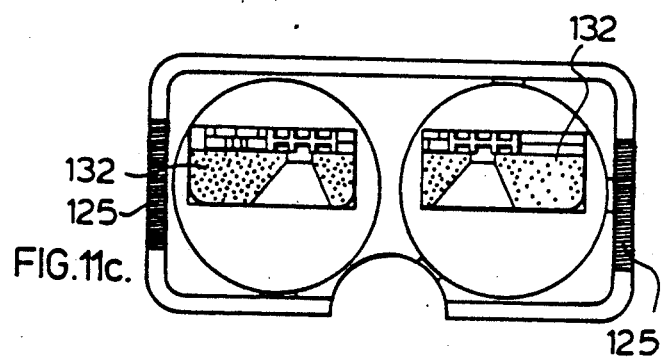

A further enhancement is shown in FIG. 11. In this case, as the user 122 tilts his head back to view the higher part of the image 128, a reduced field of view is seen and the portion of the screen 130 outside of this image viewing area is blacked out, as illustrated in FIG. 11a. FIG. 11b illustrates when the viewer's head is horizontal. FIG. 11c shows a view 132 of the lower part of the field. The portion of the viewing screen which is not in use is blacked out to increase the realistic effect.

Figure 12:
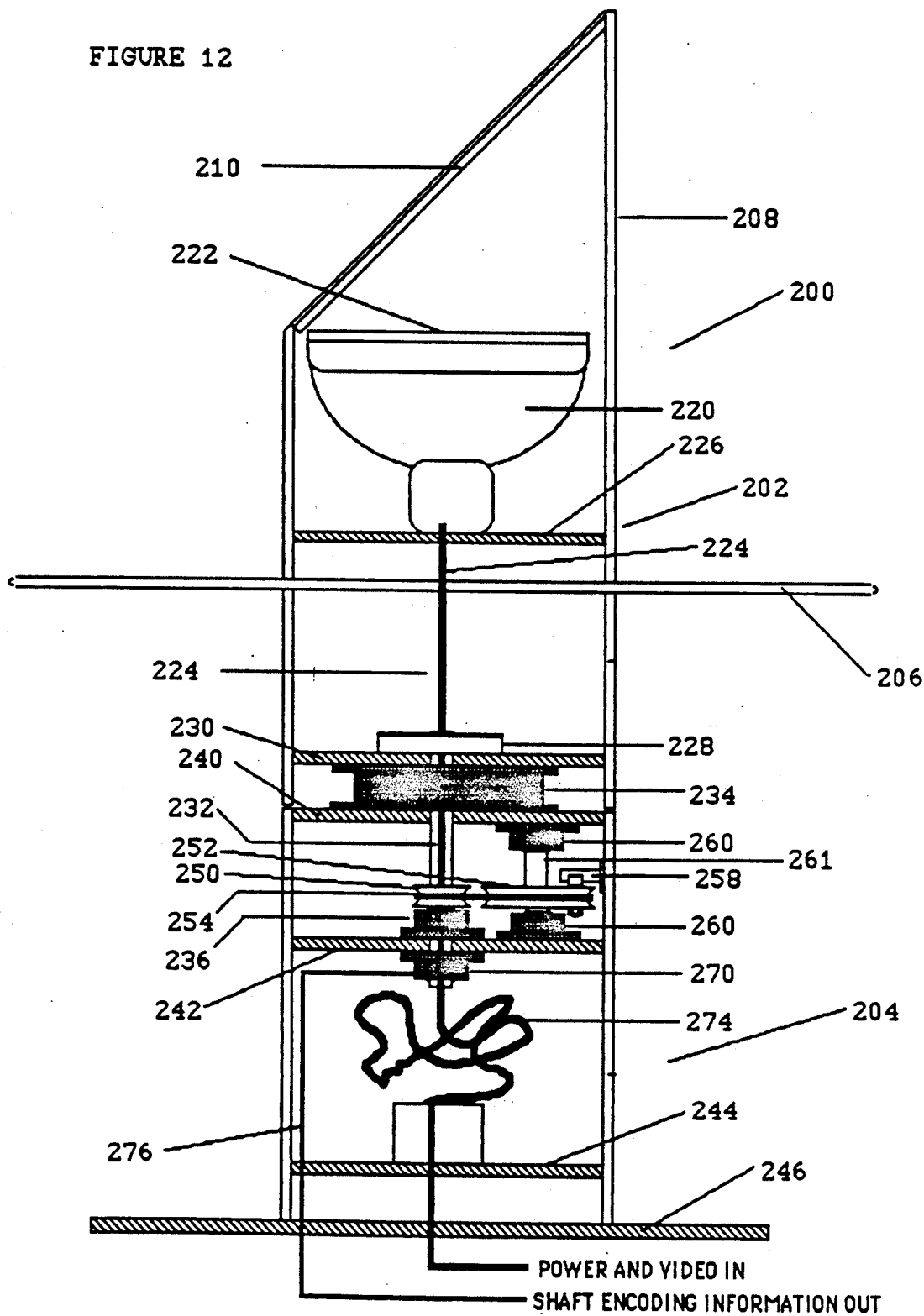
FIG. 12 is a vertical section of a video display viewing arrangement.
Figure 13:
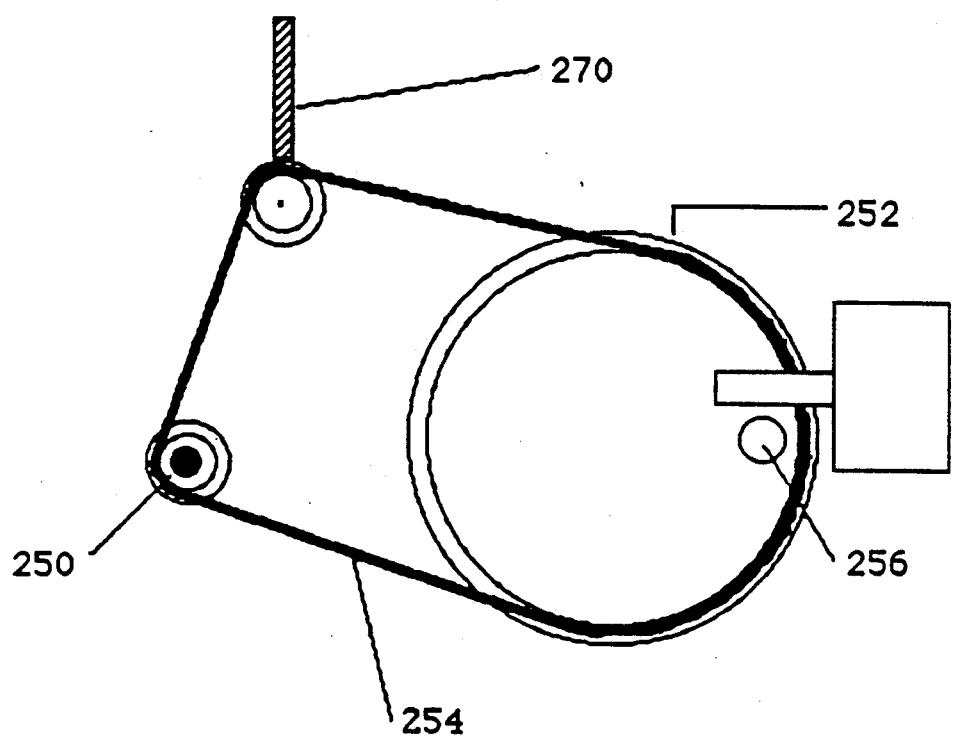
FIG. 13 is a top view of the pulley arrangement illustrating the various components associated with the rotatable sections of the viewing arrangement.

FIGS. 12 and 13 show details of a panoramic viewing arrangement 200 having a rotating top cylindrical section 202 pivotally supported by a base cylindrical section 204. A hand rail 206 is secured to the rotating top section to allow a user to rotate the top section about a vertical axis of the base section 204. The panoramic viewing arrangement 200 includes a viewing area 208 which is observed by a viewer. The viewing area is a result of the image being projected from the video display tube 220 which is reflected off the mirror 210 to present the image at the viewing area 208. This type of arrangement uses folded optic techniques to space the viewer from the video display screen 222 of the video display tube 220.

The video display tube 220 is supported by support 226 provided in the rotating top section 202, and the power and video in cable 224 extends through this support surface 226. The power and video in cable 224 passes through the shaft fastener 228 and enters the hollow shaft 232 which passes out of the bottom of the top section 208 and extends into the stationary base section 204. The hollow shaft 232 passes through the bottom support 230 of the rotating top section 202 and the shaft fastener 228 is secured to this bottom support 230. With this arrangement, the hollow shaft 232 rotates with rotation of the top section 202.

A large bearing arrangement 234 is provided at the bottom of the top section 202 and the upper part of the base section 204 to secure the two sections and to allow rotation of the top section relative to the base section. Bearing 234 is supported on horizontal support 240 of the base section 204. The base section 204 also includes intermediate support 242, lower support 244, and a base member 246 which extends beyond the sidewalls of the base section. This enlarged base member provides additional stability for the panoramic viewing arrangement 200.

An optical shaft encoder 260 is provided at the base of the hollow shaft 232 and accurately determines the amount of rotation of the hollow shaft 232, and thus the amount of rotation of the rotating top section 202 relative to the base section 204. The signal from the optical shaft encoder is then processed and used for varying the segment of a stored panoramic image whereby the amount of movement of the top section results in the appropriate change in the portion of the panoramic image viewed. Thus, if a 360° panorama is stored in a buffer and the video display unit 220 displays approximately a 90° segment. The 90° segment of the panoramic image that is displayed, is determined by the optical shaft encoder to preferably correspond to the direction of the rotating top section 202. Thus, when the rotating top section is generally facing north, the portion of the panoramic image that faces north is displayed. Similarly, if the unit is facing west, the west portion of the panoramic image is viewed. In this way, a person seeking to view the entire panoramic image must rotate the top section 202 by means of the handle 206 and physically move his own body to view the new panorama. This matching of the person's body movement to a preferably equal corresponding movement in the selected portion of the panorama viewed, provides sensory feedback to the user similar to what would actually occur if the user was viewing the actual panorama, as this approach forces the user to move thereby changing the points of reference about him as the points of reference change in the viewed panorama. Thus, the device forces the user to go through a physical movement corresponding to the type of physical movement that would normally be encountered to achieve that result. A person's fast movement results in a fast movement of the selected segment and some blurring which also corresponds with what would happen in real life should a person quickly change their direction. They do not have a continuous focus, but rather a blurred focus until they stop and refocus at the desired location. This effect also occurs with the present system.

The present system is preferably designed to have a one to one correspondence with movement of the person through a certain angle relative to the movement of the panorama through a certain angle. Although this is desired, it is certainly not limited to this and there may be certain applications where it would be advantageous to have a different correspondency rather than one to one. Any linked movement controlled by the user is within the scope of the present invention.

The panoramic viewing arrangement, as shown in FIG. 12, results in a coordination of the user or an interaction of the user with the apparatus to cause the user to go through certain physical movements which generally correspond to movements that he would actually have to carry out for viewing of the actual panorama corresponding to the image stored in the buffer. The panoramic viewing arrangement when rotated causes a different portion of the panorama to be displayed by the video display tube 220.

Rotation of the top section 202 relative to the base section 204 causes some problems with respect to the power and video in cable 224. This assumes that the memory buffer arrangement and the computer for selective viewing of the buffer arrangement is exterior to the top section 202. In order to allow rotation of the top section 202, excess cable 274 is provided in the base section 204. This excess cable allows for a large amount of rotation of the top section 202 relative to the base before any damage to this cable could occur. The cable between the optical shaft encoder and the top section merely rotates with the top section and thus, all wrapping of the cable occurs in the lower portion of the base section 204. The shaft encoder outputs to the computer (not shown) via cable 276. The signal from the optical shaft encoder is processed to provide the necessary adjustment of the segment of the stored panorama viewed. This is explained with respect to the earlier drawings.

The panoramic viewing arrangement 200 does include an arrangement for limiting the extent that the top section 202 may be rotated relative to the base portion 204 to avoid overwinding of the power and video in cable 224. This limiting arrangement is partially defined by the small pulley wheel 250 secured to the hollow shaft 232 in combination with the large pulley wheel 252 offset from the hollow shaft 232. The large pulley wheel 252 is supported by means of a shaft 261 vertically supported by means of bearings 260. Pulley wheels 250 and 252 are connected via the pulley belt 254.

As can be seen in FIG. 13, a tension idler pulley 270 is provided which merely serves to appropriately tension the pulley belt 254 relative to the pulley wheels 250 and 252. Pulley wheel 250 is much smaller in circumference than the larger pulley wheel 252. There is an approximate 8 to 1 relationship between these two pulley wheel circumferences. Rotation of the hollow shaft 232 causes rotation of the small pulley wheel 250 and a corresponding rotation of the pulley wheel 252. Associated with pulley wheel 252 is a stop bolt 256 which is adapted to engage the fixed stop 258. When the stop bolt 256 is directly opposite the fixed stop 258, the power video in cable 274 is in a neutral position, or generally neutral position. Rotation of the top section 202 will cause the stop bolt to rotate relative to the fixed stop 258, and with sufficient rotation, will cause the stop bolt 256 to strike the fixed stop 258, as generally shown in FIG. 13. Further rotation of the top section in this direction is opposed by the engagement of the stop bolt 256 and the fixed stop 258. Some rotation can occur only as a result of slippage of the belt 254 on the large pulley wheel 252. Thus, some slippage is accommodated in the stop position, however the user will quickly recognize that there is some binding going on and will rotate the device in the opposite direction. Sufficient rotation of the top section 202 in the opposite direction will result in the stop bolt 256 striking the opposite side of the fixed stop 258 and a similar lock up will occur. Thus, this pulley arrangement provides a very simple means for limiting the amount of tension or stress than can be placed on the power and video in cable 224 to avoid any damage thereof.

Rotational couplings could also be used to avoid this winding of cables, however such couplings are not generally used with respect to video cables. If such a coupling was used, there would be no need to provide the stop arrangement as described with respect to FIG. 13.

The device has been described with respect to an optical shaft encoder for sensing rotational movement of the rotatable top section relative to the base section and producing a proportional signal for varying the viewed segment of the stored panoramic image. It can be appreciated that other devices for tracking this rotational and varying the image viewed can be used.

A further approach with respect to the unit, as shown in FIG. 12, is incorporating the computer and frame buffer in the rotating section 202 whereby only the power for driving these components need be connected to a rotating coupling. Rotating couplings for power components are certainly much more widely used and readily available. Thus, by providing the computer and frame buffer within the rotating top section 202, the stop arrangement would not be required.

With the stand as generally shown in FIG. 12, one computer can process the signals received from several shaft encoding devices of separate panoramic viewing arrangements 200 and thus, the cost for such multiple units would be less, as the computer could be shared by several such units.

The use of the panoramic viewing arrangement of FIG. 12 has been described with respect to a single user however it is apparent this arrangement can be shared by two or more people with all users experiencing the same interaction with the changing reference points of the users as the reference points in the viewed panoramic image change. Thus shared viewing is possible at no additional cost which introduces the benefits of user interaction in viewing the stored image or images.

Although the panoramic viewing arrangement has been described with respect to the structure as generally shown in FIG. 12, a lower cost arrangement is possible where the rotating top section generally stops at support 226 which forms the upper surface of the rotating top section. The user then connects a separate video display terminal to the viewing arrangement to provide a similar structure. This modified arrangement is certainly less expensive than the dedicated type unit shown with respect to FIG. 12.

In some applications, the video display arrangement shown in FIG. 12 can be modified to provide, for example, four separate viewing areas within the rotating top section 202. This might be particularly advantageous at tourist sites where various users could be located about the unit. All units would be rotated simultaneously or with the rotating top section 202 and the segment of the panoramic viewed by each unit would be appropriately adjusted. Thus, although the panoramic viewing arrangement 200 shows one video display unit suitable for generally one user or users orientated in one direction, multiple units within the panoramic viewing arrangement are possible to allow multiple viewing, albeit these multiple viewings will be in different directions.

The modified rotatable control described with respect to FIG. 12 could support a image projecting arrangement whereby the projected image is captured on a screen about the rotatable control. Rotation of the control varies the segment of the panoramic image projected.

It has been found, with the panoramic viewing arrangement of the present invention, that it is superior to static viewing situations such as joysticks, in that the user experiences normal body feedback sensations resulting from a change in viewing direction in combination with the change in the image displayed. Thus, the present invention links in an efficient and effective manner a person's normal body functions used to view a real panorama with a user changeable panoramic image. The structure causes the person to use similar body movements for viewing of the recorded panorama image as are required for viewing the actual panorama.

The preferred panoramic viewing arrangement of FIG. 12 or the modified structure as described with respect to FIG. 12 provides a simple cost effective mechanism which is extremely user friendly and allows the individual to easily use the device and quickly understand how the device works. This arrangement is considered particularly useful for any application where it is desirable to view panorama images and have a better feel for body response in association with this viewing. Applications will certainly be apparent to architects who are trying to convince clients with respect to a particular location or how this location impacts upon certain plans that they have, as well as other applications such as tourist applications, as but two examples.

The viewing arrangement as disclosed in FIGS. 12 and 13 provide a low cost alternative to the much higher cost alternative of video glasses.

Although various preferred embodiments of the present invention have been described herein in detail, it will be appreciated by those skilled in the art, that variations may be made thereto without departing from the spirit of the invention or the scope of the appended claims.

THE EMBODIMENTS OF THE INVENTION IN WHICH AN EXCLUSIVE PROPERTY OR PRIVILEGE IS CLAIMED ARE DEFINED AS FOLLOWS:

1. A system for viewing of a real panoramic image comprising:
   frame buffer means for digitally storing the real panoramic image, and means for viewing of a selected segment of the stored real panoramic image, said viewing means including user controlled movable viewing screen means, said movable viewing screen means displaying the selected segment of the stored real panoramic image, said viewing means having sensing means for sensing rotational movement of said viewing means and in accordance with the sensed rotational movement adjusting the selected segment of the stored real panoramic image stored in the frame buffer means, whereby the user selectively moves said viewing screen means to vary the selected segment of the stored real panoramic image displayed by said viewing screen means.

2. A system as claimed in claim 1 wherein said viewing screen means is a video display terminal mounted on a rotatable base and including handle means for rotating said rotatable base about a vertical axis, said rotatable base including means for sensing the rotational position of said base which forms part of said sensing means for sensing rotational movement of said viewing means.

3. A system as claimed in claim 1 wherein said user controlled viewing means is a pair of video glasses.

4. A system as claimed in claim 1 wherein said viewing screen means is suitable for viewing by a plurality of users simultaneously.

5. A system as claimed in claim 4 wherein said sensing means for sensing rotational movement of said viewing means includes an optical shaft encoder which is rotated with rotation of said base and produces an output signal for varying said selected segment of the real panoramic image viewed.

6. A video display viewing table comprising a base portion and a top section rotatable relative to said base portion and supported relative to said base portion by a shaft fixed to rotate with said top section and bearingly supported in said base portion, said shaft driving an optical shaft encoder whereby rotation of said top section relative to said base portion can be sensed and estimated by said optical shaft encoder.

7. A video display viewing table as claimed in claim 6 wherein said shaft includes a further pulley and belt driving a larger rotation limiting pulley having a stop surface thereon which cooperates with a fixed stop surface secured to said base portion whereby after a predetermined rotation of said top portion relative to said base portion further rotation in the same direction is opposed by engagement of said stop surfaces.

8. A video display viewing table as claimed in claim 7 wherein said shaft is hollow.

9. A video display viewing table as claimed in claim 8 including a tension idler disposed between said rotation limiting pulley and said shaft to tighten the pulley belt therebetween while allowing some slippage therebetween when said locking surfaces are in engagement.

* * * * *